Oct. 15, 1968    C. G. ROBINSON    3,406,239
POWER CABLE ARRANGEMENT FOR ELECTRIC ARC FURNACES
Filed Aug. 25, 1965
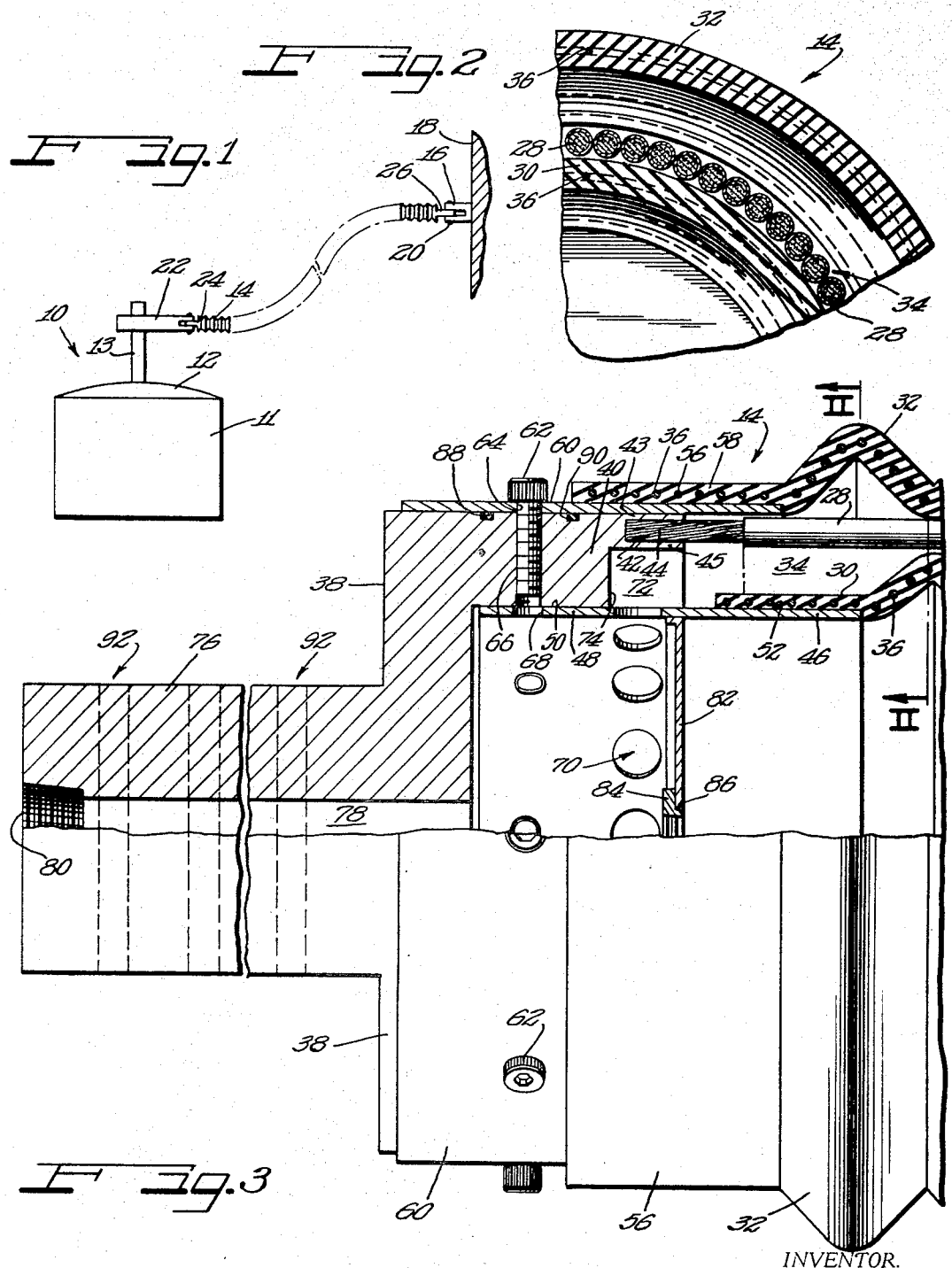
INVENTOR.
Charles G. Robinson
ATTORNEYS

United States Patent Office 3,406,239
Patented Oct. 15, 1968

3,406,239
POWER CABLE ARRANGEMENT FOR ELECTRIC ARC FURNACES
Charles G. Robinson, Sterling, Ill., assignor to Northwestern Steel and Wire Company, Sterling, Ill., a corporation of Illinois
Filed Aug. 25, 1965, Ser. No. 482,515
3 Claims. (Cl. 13—9)

ABSTRACT OF THE DISCLOSURE

A current delivery cable having a plurality of current carrying conductors helically wound about an inner flexible tube. An outer flexible tube surrounds the conductors and forms a chamber with the inner tube for receiving cooling liquid. A connector is provided at each end of the current delivery cable. A fluid passage is formed in each of the connectors to direct the fluid flow through the chamber formed by the inner flexible tube and the outer flexible tube and, to prevent fluid flow from passing through the center of the inner flexible cable.

---

This invention relates in general to a power cable arrangement for electric arc furnaces.

The present invention has particular applicability and advantages in the supplying of high voltage to electric arc furnaces of the type used for the production of steel from scrap. Such furnaces have now become relatively well-known in the art and usually have three electrodes as part of a three-phase power supply system, with the electrode current ranging from 20,000 to 80,000 amperes to provide and sustain the arcs.

In the past in order to obtain a balanced three-phase power supply to maintain equal arc power consumption, the prior art cable arrangements included a group of cables connected in parallel for each phase with the individual cables held in a predetermined space relationship to each other such that the impedances between the phases may be balanced. This arrangement requires the individual cables of each phase to be held by some spacing element in a specified spacial relationship, which relationship is difficult to maintain over long lengths of such cables and especially at cable portions between the spacing elements. In particular, these cables have a tendency to draw together between the spacers, thus increasing the self-inductance and the resulting inductive impedance for the particular phase, thereby providing an unbalanced and inefficient power supply system.

It is therefore an object of the present invention to provide an efficient power cable arrangement for electric arc furnaces.

Another object of this invention is to provide a liquid cooled power cable arrangement for electric arc furnaces.

A further object of this invention is to provide a power cable arrangement wherein cooling water is passed between concentric flexible tubes to provide cooling of a conductor wound around the inner tube.

Other objects and advantages of this invention and a fuller understanding of the nature thereof may be had by referring to the following detailed description taken in conjunction with the accompanying drawings.

FIGURE 1 is an elevational view in somewhat diagrammatic form illustrating a cable arrangement constructed in accordance with the principles of the present invention incorporated to supply power to an electric arc furnace.

FIGURE 2 is a sectional view illustrating a cable arrangement according to the present invention.

FIGURE 3 is an enlarged fragmentary sectional view illustrating a connector end of the cable shown in FIGURE 1.

As shown on the drawings:

The present invention contemplates a power cable wherein the conducting element is wound around an inner tube with an outer tube maintained spaced from the inner tube and defining a chamber. In one aspect of the invention liquid cooling means is supplied to the conducting elements within the chamber.

Referring to FIGURE 1, there is shown a typical electric arc furnace 10 having a cylindrical refractory lined furnace chamber 11 with a top 12 which may be swung to an open posiiton in order to recharge the furnace. In the usual configuration a three-phase power supply system supplies the necessary power to three spaced electrodes which project through the top 12 and into the chamber 11. For simplicity only one of these electrodes 13 has been shown connected through a cable 14 to the power supply system. It is understood that in a usual three-phase system three electrodes such as electrode 13 are supplied by three respective cables such as cable 14.

The associated equipment to support and position the electrodes within the furnace chamber 11 is provided in the usual well-known manner and the invention herein is not concerned with this matter.

A multi-phase power input source is coupled to a terminal block 16 which is mounted on a wall 18 in the vicinity of the furnace 10. On the terminal block 16 there is mounted the required number of terminals with one of such terminals having been illustrated as terminal 20. Electrically connected and mechanically mounted upon the electrode 13 is a coupling ring terminal 22 for coupling electrical power from a supply cable to the electrode 13.

For the purpose of illustrating the incorporation of the cable 14 constructed according to the principles of the present invention within an electric arc furnace configuration, the cable 14 includes an end connector 24 which is coupled to the ring terminal 22 and a similar end terminal 26 which is connected to the terminal 20. It must be realized of course that in the normal three-phase power supply system for an electric arc furnace a group of three electrodes each being similar to that illustrated by the reference numeral 13 would each be individually supplied power by a cable such as illustrated with the reference numeral 14. Each of the cables 14 is flexible to allow the respective electrodes 13 to be positioned within the chamber 11 and to be removed therefrom when desired.

Referring now to FIGURE 2 there is illustrated the construction details of the cable 14. Forming the conducting element of the cable 14 is a number of braided copper conductors 28 wound about a flexible inner tube 30 in a helical path, and which conductors 28 are electrically connected at both ends to form a single conductor. A flexible outer tube 32 is formed concentrically around the inner tube 30 so as to define a water chamber 34 surrounding the conductors 28 throughout their length. The tubes 30 and 32 are constructed of rubber and fabric and reinforced with wires 36 to aid in supporting the copper conductors helically wound thereon.

In FIGURE 3 both the inner tube 30 and the outer tube 32 are shown as accordion pleated so as to enhance the flexibility of the cable 14. Providing an electrical connection to the copper conductors 28 at each end of the cable 14 is a connector 38. Extending from one end of the connector 38 is a boss 40 including an annular recess 42 which extends completely around the boss 40 and adjacent the ends of the conductors 28 and which is defined by an upper protruding ledge 43 and a lower protruding ledge 45.

An electrical connection is provided between the connector 38 and the conductors 28 by extending the conductors into the recess 42 with a conductor end 44 turned backwardly along the recess. Thus, the braided conductors 28 lie adjacent to each other around the inner tube 30 with their respective ends fittingly engaged into the recess 42 around the boss 40. An electrical connection is secured between the connector 38 and the conductors 28 by soldering the conductor ends within the recess 42 to the ledges 43 and 45.

Between the connector 38 and the tubes 30 and 32, at each end of the cable 14, means are provided to allow a cooling liquid to flow through the water chamber 34 to thus cool the conductors 28 therewithin. In particular, a cylindrical inner ring 46 has one end 48 abutting an inside wall 50 of the connector 38. The inner flexible tube 30 is secured at the cable end to an outer surface 52 of the ring 46.

A cylindrical non-pleated end 54 of the inner tube 30 is secured by cementing or by other suitable means to the outer surface 52 so as to form a sealed connection between the inner ring 46 and the inner tube 30. Similarly, a cylindrical non-pleated end 56 of the tube 32 is also secured to an outside surface 58 of an outer cylindrical ring 60. This connection also insures a seal between the outer tube 32 and the ring 60.

The outer ring 60, the connector 38 and the inner ring 46 are rigidly secured together by means of a series of bolts 62 passing through an aperture 64 in the ring 60 to engage a threaded aperture 66 in the connector 38. The bolts 62 can be provided long enough so that they will also pass through an aperture 68 in the inner ring 46 to keep the inner ring somewhat locked in position during flexing or twisting of the cable 14. However, this is not necessary since the inner ring 46 is nested within the connector 38 at each end of the cable.

Formed in a single line completely around the circumference of the inner ring 46 is a series of apertures in the form of circular cutouts 70 which lead from inside the ring 46 into an annular channel 72 defined below the lower protruding ledge 46 and adjacent a back wall 74 of the connector 38. The annular channel 72 opens into the water chamber 34 defined between the outer tube 32 and the inner tube 30.

A coupling end 76 of the connector 38 includes a passageway 78 which extends from a threaded opening 80 at one end of the coupling end 76 to communicate with the area defined within the inner ring 46. Thus, the conductors 28 within the chamber 34 are cooled by providing a liquid coolant at the threaded opening 80 which passes through the passageway 78 and the cutouts 70 and is directed by the annular channel 72 into the chamber 34. Any of the common types of suitable liquid coolants such as water or oil can be utilized.

A circular plate 82 is welded inside of the inner ring 46 and a sealing plug 84 is threadably engaged and tightened within the threaded aperture 86 in the plate 82. The plugged plate 82 forms a sealed wall within the inner ring 46 to allow the cooling liquid coming from the passageway 78 to pass through the apertures or circular cutouts 70 in the ring 46. This prevents the cooling liquid from passing through the ring and within the interior of the inner tube 30. Also, to prevent any possible leakage of the cooling liquid through the apertures 68, 66 and between the abutting surfaces of the outer ring 60 and the connector 38, a gasket seal 88 is located around each of the bolts 62 within an annular groove 90 in the connector 38.

Providing means for electrically coupling to the conductors 28, is a series of properly spaced coupling positions 92 on the coupling end 76 of the connector 38. These mounting positions 92 allow for the well-known types of terminals 20 and ring terminals 22, which are utilized in the art to form an electrical connection with the connector 38 and hence to the braided copper conductors 28.

Electrical insulation of the conductors 28 and the connector 38 from the cooling liquid may be provided in a manner well known in the art. If desired, water which has been distilled to remove most of the impurities may be utilized as the liquid coolant because of the poor electrical conductive qualities of distilled water.

Thus there has been provided herein a power cable arrangement with the conducting element formed helically around a flexible inner tube and with a flexible outer tube provided concentrically around the inner tube and the conductor to allow a cooling liquid to be passed between the tubes and over the conductors. Such a power cable arrangement is especially adaptable to use in supplying power to the electrodes of an electric arc furnace to eliminate problems encountered with conventional space of power cable arrangements.

In particular, whereas one of the prior power cable arrangements heretofore used in the art utilized four symmetrically spaced and separated water-cooled cables in each of two separate phases and two separated water-cooled cables in the remaining phase of a three-phase power supply system, it is possible to replace these ten cables with three separated water-cooled cables, one for each of the phases constructed in accordance with the principles of the present invention. Thus, the problems encountered in keeping each of the cables in the prior art systems precisely separated has been eliminated and further the number of cables required is reduced.

Although the drawings and specification present a detailed disclosure of preferred embodiments of the present invention, it is to be understood that the invention is not limited to the specific forms disclosed, but covers all modifications, changes and alternative constructions falling within the scope of the principles taught by the invention.

I claim as my invention:
1. A water cooled power cable arrangement comprising:
an inner flexible tube;
a plurality of braided conductors helically wound about said inner tube and extending over the length thereof;
an outer flexible tube concentrically formed around said inner tube and defining a chamber therewith, said chamber surrounding and coextensive with the length of said conductors;
a connector at each end of said cable for connecting said conductors in parallel relation;
an annular recess formed around each of said connectors;
said recess accommodating therewithin the respective ends of said conductors;
sealing means for sealing the respective connector to said inner and outer tubes at each end of said cables; and
water cooling means for directing cooling water from one end of said cable through the corresponding connector and into said chamber surrounding said conductors;
said cooling water exiting at the other end of said cable through the corresponding connector.

2. A water cooled power cable arrangement comprising:
an inner flexible tube;
a plurality of braided conductors helically wound about said inner tube and extending over the length thereof;
an outer flexible tube concentrically formed around said inner tube and defining a chamber therewith, said chamber surrounding said conductors and coextensive therewith over the length of said conductors;
a connector at each end of said cable for electrically connecting said conductors in parallel relation, each of said connectors having a passageway;
an inner tubular ring at each end of said cable, one end of said ring lying within the respective connector, with said flexible inner tube sealingly mounted to the other end of said ring;
said inner ring having a series of circumferential apertures communicating the inside of said ring at one end with said chamber and at the other end with said respective passageway;

an outer tubular ring rigidly connected around said connector and having one end sealingly attached to said outer flexible tube; and water cooling means for directing cooling water from one end of said cable through the respective passageway in the connector and into said chamber surrounding said conductors;

said cooling water exiting at the other end of said cable through the respective connector passageway.

3. In an electric arc furnace including:

a furnace chamber, three electrodes adjustably mounted in said furnace or chamber, a three-phase electrical power source having three terminals in fixed positions relative to said furnace chamber, power cable means interconnecting said electrodes and said terminals, the improvement therein comprising said power cable means which includes:

an inner flexible tube, a plurality of braided conductors helically wound about said inner tube and extending over the length thereof, an outer flexible tube concentrically formed around said inner tube and defining a chamber therewith, said chamber surrounding said conductor and coextensive therewith over the length of said conductors, a connector at each end of said cable for electrically connecting said conductors in parallel relation, each of said connectors having a passageway, an inner tubular ring at each end of said cable, one end of said ring lying within the respective connectors, with said flexible inner tube sealingly mounted to the outer end of said ring, said inner ring having a series of circumferential apertures communicating the inside of said ring at one end of said chamber and at the other end with said respective passageway, an outer tubular ring rigidly connected around said connector and having one end sealingly attached to said outer flexible tube, and liquid cooling means for directing cooling liquid from one end of said cable through the respective passageway in the connector and into said chamber surrounding said conductors, said cooling liquid exiting at the outer end of said cable through the respective connector passageway.

References Cited

UNITED STATES PATENTS

| | | | |
|---|---|---|---|
| 1,878,790 | 9/1932 | Lund | 174—47 |
| 2,320,470 | 6/1943 | Rees | 174—15 |
| 2,946,837 | 7/1960 | Beamish | 174—15 |

BERNARD A. GILHEANY, *Primary Examiner.*

H. B. GILSON, *Assistant Examiner.*